United States Patent [19]
Adachi et al.

[11] Patent Number: 5,787,853
[45] Date of Patent: Aug. 4, 1998

[54] VALVE SEAT-BONDING AREA STRUCTURES AND VALVE SEAT-BONDED CYLINDER HEAD WITH THE STRUCTURES

[75] Inventors: Shuhei Adachi; Hiroyuki Sakai, both of Iwata, Japan

[73] Assignee: Yamaha Hatsudoki Kabushiki Kaisha, Shizuoka, Japan

[21] Appl. No.: 601,287

[22] Filed: Feb. 16, 1996

[30] Foreign Application Priority Data

Feb. 16, 1995 [JP] Japan .................................. 7-028217

[51] Int. Cl.$^6$ ................................................ F01L 3/22
[52] U.S. Cl. .................................. 123/193.5; 123/188.8
[58] Field of Search ............................ 123/188.8, 193.5

[56] References Cited

U.S. PATENT DOCUMENTS 4,831,976  5/1989  Pozniak et al. .
4,896,638  1/1990  Shepley .

FOREIGN PATENT DOCUMENTS

| 0064367 A3 | 4/1982 | European Pat. Off. . |
| 0092683 A1 | 3/1983 | European Pat. Off. . |
| 0228282 A3 | 12/1986 | European Pat. Off. . |
| 3613299 A1 | 10/1987 | Germany . |
| 3928597 A1 | 3/1991 | Germany . |
| 4322435 A1 | 1/1995 | Germany . |

Primary Examiner—Erick R. Solis
Attorney, Agent, or Firm—Knobbe Martens, Olson & Bear, LLP

[57] ABSTRACT

Valve seat-bonding area structures of a cylinder head unit, wherein a valve seat made of a metal different from and harder than that of the cylinder head unit is bonded to a circumference of a valve opening of the cylinder head unit, which structures are characterized in that a second tapered guide surface, which has an open angle larger than that of a first tapered guide surface with respect to an axis of a valve shaft, is formed outward of the first tapered guide surface in order to prevent pitting and cracking of the surfaces during grinding and improve the gas-interchanging efficiency.

23 Claims, 8 Drawing Sheets

VALVE SEAT-BONDING AREA STRUCTURES AND VALVE SEAT-BONDED CYLINDER HEAD WITH THE STRUCTURES

BACKGROUND

1. Field of the Invention

This invention relates to valve seat-bonding area structures of a cylinder head for internal combustion engines, and in particular, to such structures allowing for an increase in the gas-interchanging efficiency, prevention of the occurrence of pitting or cracking during a grinding process, and improvement in machinability. This invention also relates to a valve seat-bonded cylinder head having the above structures.

2. Background of the Art

A cylinder head for an internal combustion engine block has a recessed portion constituting the top portion of a cylinder bore (i.e., a combustion room) of the engine block. In the recessed portion, normally, at least one opening for an intake gas valve and at least one opening for an exhaust gas valve, which lead to an exhaust gas port and an intake gas port respectively, are provided, and the openings are opened and closed with an exhaust gas valve and an intake gas valve respectively.

At each valve opening, a valve seat, which the exhaust gas valve can airtightly contact, is provided. The valve seat has surfaces generally consisting of a first tapered surface (tapered inward guide surface), which is tapered at an open angle of normally 30° with respect to an axis of a valve shaft, a second tapered surface (valve seat surface), which is tapered at an open angle of normally 90°, and a third tapered surface (tapered outward guide surface), which is tapered at an open angle of normally 120°.

Heretofore, the first, second, and third tapered surfaces are formed using a 30°-grinding bit, a 90°-grinding bit, and a 120°-grinding bit, each being concentrically installed in a bit holder. The 30°-grinding bit and the 120°-grinding bit first move forward so as to simultaneously form the first and third tapered surfaces, and then move back 0.2–1.0 mm, and the 120°-grinding bit moves forward so as to form the second tapered surface.

However, drawbacks are associated with the above-mentioned structures. That is, when the second tapered surface (valve seat surface) is formed with the 90°-grinding bit, pitting or cracking is likely to occur on the treated surface, resulting in defective products. In addition, pitting occurs in the bit itself in some cases, thereby shortening the durability of the bit.

Further, a valve seat is made of a metal different from and harder than that of a cylinder heat unit itself so as to allow for high abrasion resistance, high heat resistance, and secure sealing. Thus, when subjected to grinding after the valve seat is bonded to the cylinder head unit, it is very difficult to grind and finish with high accuracy the valve seat surfaces to provide a certain tapered surface because the two metals, each having a different hardness, are simultaneously ground with a common bit under common grinding conditions. Furthermore, pitting occurs in the bit itself depending on the grinding conditions.

The valve seat can be bonded to the cylinder head by solid-state diffusion or metallic bonding, i.e., by impressing a voltage between a valve seat ring (e.g., made of an Fe-based sintered alloy) and a circumference of the valve opening of a cylinder head unit (e.g., made of an aluminum alloy) while pressing the valve seat ring against the circumference of the valve opening. This bonding method is disclosed in, for example, Japanese patent laid-open Nos. 4-114220 (1992) and 5-336657 (1993). When the valve seat is bonded to the cylinder head unit by the above binding method, an intermetallic layer, in which metallic atoms are diffused, is formed in the boundary between the metal of the valve seat and that of the cylinder head unit. In the intermetallic layer, formation of porous areas is likely to occur. When that occurs, pitting is easily caused therein due to intermittent grinding with a bit.

SUMMARY OF THE INVENTION

The present invention has exploited the grinding performance of a valve seat bonded to a cylinder head unit. An objective of the present invention is to provide a valve seat-bonding area structures, which allows for improvement in machinability and prevention of the occurrence of pitting or cracking during a grinding process, and further allows for an increase in the gas-interchanging efficiency.

Namely, one important aspect of the present invention is valve seat-bonding area structures of a cylinder head unit, wherein a valve seat made of a metal different from and harder than that of said cylinder head unit is bonded to a circumference of a valve opening of said cylinder head unit, said valve seat-bonding area structures comprising: a valve seat surface which is circumferentially formed on said valve seat, said surface being tapered at a first angle with respect to an axis of a valve shaft; a first tapered guide surface which is circumferentially formed outward of said valve seat surface, said first tapered guide surface being tapered at a second angle which is greater than said first angle with respect to the axis of the valve shaft; and a second tapered guide surface which is circumferentially formed outward of said first tapered guide surface, said second tapered guide surface being tapered at a third angle which is greater than said second angle with respect to the axis of the valve shaft. By providing the second tapered guide surface, it is possible to effectively prevent the occurrence of pitting and cracking of the finished surface during grinding, thereby increasing productivity and improving the durability of the bits. Upon intensive experimentation, it has been revealed that pitting and cracking appears to be caused by vibration transferred to the 90°-grinding bit, which vibration is generated by the 120°-grinding bit touching the tapered guide surface (the third tapered surface) when grinding the valve seat surface (the second tapered surface) with the 90°-grinding bit. By forming the second tapered guide surface (the fourth tapered surface), it is possible to effectively prevent the 120°-grinding bit from touching the tapered guide surface (the third tapered surface). Further, according to the above structures, the gas-interchanging efficiency is improved due to the second tapered guide surface formed, outward of the first tapered guide surface, at an opening angle larger than that of the first tapered guide surface. Upon lifting a valve, intake gas is introduced into a cylinder through a gap between the valve seal surface and the valve seat surface. The gas flow slows at the second tapered guide surface, because the surface has a greater open angle with respect to the axis of a valve shaft. The gas thereby smoothly flows into the interior of the combustion room, without separating from the surface of the recessed portion of the combustion room. Smooth gas flow renders the gas-interchanging efficiency high.

In the above structures, when the outward boundary between said valve seat and the metal of said cylinder head unit is located in either of said first tapered guide surface or said second tapered guide surface, especially in which surface the ratio of the surface area of the metal of said cylinder head unit to the surface area of the metal of said valve seat is grater than or less than one, it is possible to improve the grinding accuracy by selecting a bit and grinding conditions based on the characteristics of the predominant material on the surface. Further, it is possible to prevent the occurrence of pitting of the bit.

Another important aspect of the present invention is valve seat-bonding area structures of a cylinder head unit, wherein a valve seat made of a metal different from and harder than that of said cylinder head unit is bonded to a circumference of a valve opening of said cylinder head unit, said valve seat-bonding area structures comprising: a valve seat surface which is circumferentially formed on said valve seat, said surface being tapered at a first angle with respect to an axis of a valve shaft; and a tapered guide surface which is circumferentially formed outward of said valve seat surface, said tapered guide surface being tapered at a second angle which is greater than said first angle with respect to the axis of the valve shaft, wherein the outward boundary between said valve seat and the metal of said cylinder head unit is located in said tapered guide surface. Based on the above structures, it is possible to improve the grinding accuracy by selecting a bit and grinding conditions suitable for grinding the predominant material on the surface. Further, it is possible to prevent the occurrence of pitting on the bit.

In the aforesaid valve seat-bonding area structures of a cylinder head unit, the metal of said valve seat is preferably made of a metal having high abrasion and heat resistance, such as Fe-based sintered alloy, and the metal of said cylinder heat unit is preferably made of a durable and lightweight metal such as an aluminum alloy. In order to strengthen the bonding between the valve seat and the cylinder head unit, the valve seat is preferably bonded to said cylinder head unit by solid-state diffusion, in which a valve seat ring has been placed on said circumference of the valve opening of said cylinder head unit, and pressed against said circumference while a voltage is impressed between said valve seat ring and said cylinder head unit. By employing the aforesaid structures, it is possible to prevent the occurrence of pitting in an intermetallic layer generated in the boundary, without reducing bonding strength between the valve seat and the cylinder head unit.

Another objective of the present invention is to provide a valve seat-bonded cylinder head comprising any one of the aforesaid valve seat-bonding area structures at each valve opening. The cylinder head unit allows for high machinability and high accuracy and durability with regard to the valve seat-bonding area structures, and further allows for an increase in the gas-interchanging efficiency and thereby increases the engine power.

BRIEF DESCRIPTION OF THE FIGURES

FIG. 7 is schematic views illustrating one embodiment of a bit holder for forming tapered-surfaces in the valve seat-bonding area, in which

DETAILED DESCRIPTION OF THE PREFERRED EMBODIMENT

Valve Seat-bonding Area Structures

In the present invention, the valve seat-bonding area structures of a cylinder head can be adapted for any type of internal combustion engine for vehicles or other apparatuses, such as automobiles and compressors. The structures comprise, at least, a valve seat surface, which is the predominant contacting surface with a valve seal surface, and a tapered guide surface, which promotes the intake gas flow and the exhaust gas flow passing through the gap between the tapered guide surface and the valve seal surface. In addition to the above surfaces, the structures normally further comprise an inward tapered surface, which also promotes the intake gas flow and the exhaust gas flow passing through the gap between the inward tapered surface and the valve seal surface. In one important aspect of the present invention, the valve seat-bonding area structures further comprise a second tapered guide surface, which is formed outward of the first tapered guide surface. The second tapered guide surface allows for prevention of the occurrence of pitting and cracking of the finished surface during grinding, and allows for improvement in the gas-interchanging efficiency by promoting the gas flow through the gap between the valve seat and the valve seal. The surfaces included in the structures are not limited to the above described surface. The structures can additionally comprise one or more surfaces formed inward of the inward tapered surface and/or outward of the second tapered guide surface. The open angle of each surface with respect to the axis of a valve shaft is arranged in such a way that the more outward the surface the greater the angle selected, i.e., the more inward the surface the smaller the angle selected. In the above, "inward" and "outward" are defined with respect to the axis of a valve shaft. For the sake of convenience, the tapered surfaces are numbered from the most inward surface to the most outward surface. For example, if the structures comprise an inward tapered surface, a valve seat surface, a first tapered guide surface, and a second tapered guide surface, they are named tapered surfaces #1, #2, #3, and #4, respectively. The open angle of each tapered surface preferably ranges from 20° to 40° for tapered surface #1, from 85° to 95° for tapered surface #2, from 100° to 180° for tapered surface #3, and from 100° to 180° for tapered surface #4, with respect to the axis of a valve shaft. Tapered surface #4 need not be subjected to finishing treatment, since the surface is not responsible for airtight sealing of a valve.

The valve seat has inward and outward circumferential boundaries between the metal of the valve seat and the metal of the cylinder head unit. The outward boundary is preferably located in either the first tapered guide surface (tapered surface #3) or said second tapered guide surface (tapered surface #4), and, in the surface in which the outward boundary is located, the ratio of the surface area of the metal of the cylinder head unit to the surface area of the metal of the valve seat is preferably grater than or less than one, more preferably $1/10$ to 10 ($\neq 1$) (further preferably $1/4$ to $3/4$ ($\neq 1$)). Also, the inward boundary is preferably located in the inward tapered surface (tapered surface #1). The desired ratio of the surface area of the metal of the cylinder head unit to the surface area of the metal of the valve seat is the same as that in the outward boundary. By grinding the surfaces at the above ratio, it is possible to improve the grinding accuracy by selecting a bit and grinding conditions based on the characteristics of the predominant material on the surface. Further, it is possible to prevent the occurrence of pitting of the bit. In this regard, the area of the cylinder head material can be greater than that of the valve seat material in the same way as above. In addition, the portion of the valve seat material is small, it is possible to reduce thermal stress generated at the boundary due to the difference between the valve seat material and the cylinder head material in coefficient of linear expansion, thereby preventing the occurrence of separation of the valve seat material from the cylinder head material.

In the above, tapered surface #4 (the second tapered guide surface) can be omitted, as long as the outward boundary is located in tapered surface #3 (the first tapered guide surface) so as to conduct grinding based on the characteristics of the predominant material on the surface.

Method For Bonding Valve Seat To Cylinder Head Unit

Bonding of a valve seat to a cylinder head unit can be conducted in various ways. For example, a laser cladding technique can be adapted, in which valve seat material is welded into a cylinder head unit with a laser beam to form a cladding layer which functions as a valve seat. A conventional resistance-welding method can also be adapted, wherein valve seat material and cylinder head unit material are partially melted so as to form an alloy solution by utilizing heat generated by the contact resistance on the surface, and the application of electricity is then discontinued so as to cool the solution. Further, a flame coating method can be employed. In order to securely bond the valve seat to the cylinder head unit, a solid-state diffusion method (plastic deformation-bonding method) is preferred. In brief, a valve seat-bonded cylinder head can be produced by a method comprising the steps of: (a) placing at least a valve seat insert having a convex surface as a bonding surface on a convex surface of a cylinder-head unit, in which said convex surface of said valve seat insert is attached to said convex surface of said cylinder head insert; (b) impressing a voltage between said convex surface of said valve seat insert and that of said cylinder head unit while pressing said valve seat insert against said cylinder head unit, in such a way that a plastic deformation layer is formed on the joining boundary at least on said cylinder head unit side, thereby bonding said valve seat insert and said cylinder head unit by solid-state diffusion, without forming a melting reaction layer therebetween; (c) cooling the resulting cylinder head unit to which said valve seat insert has been bonded; and (d) machining the resulting valve seat-bonded cylinder head. The timing of initiation of pressure and electric current will be described later.

In particular, when the valve seat has metal deposits capable of forming a eutectic alloy with the cylinder head unit, bonding by solid-state diffusion can be efficiently achieved, so that the metal deposits and the material of the cylinder head unit undergo solid-state diffusion. As a material for a valve seat, an Fe-based sintered alloy is preferably used in view of strength and abrasion resistance. The sintered alloy has a porous structure. When Cu is deposited in the pores, bonding by solid-state diffusion can be more efficiently achieved. In combination with the use of the above Cu, the use of metal (such as Cu, Zn, Sn and Ag in the case of an aluminum alloy used in the cylinder head unit) capable of forming an eutectic alloy with the cylinder head unit in a coating form is highly preferable. When the thickness of the coating is 1–30 µm, bonding by solid-state diffusion is startlingly improved.

Valve Seat-bonded Cylinder Head Unit

The above structures are normally provided in a cylinder head unit which is to be connected to a cylinder block at a lower connection surface, and a head cover at an upper connection surface. The cylinder head constitutes the top portion of a combustion room, i.e., a cylinder bore, and comprises at least one valve opening for intake gas and/or exhaust gas, normally 2–3 valve openings for each intake gas and exhaust gas. The lower connecting surface has a recessed portion corresponding to the end of the combustion room. However, the cylinder head unit can be integrate with other portions of a cylinder block.

The present invention will be explained further with reference to an example.

EXAMPLE

FIGS. 1 through 9 relate to one embodiment of the present invention.

Valve Seat-bonded Cylinder Head Unit

Figure 8:
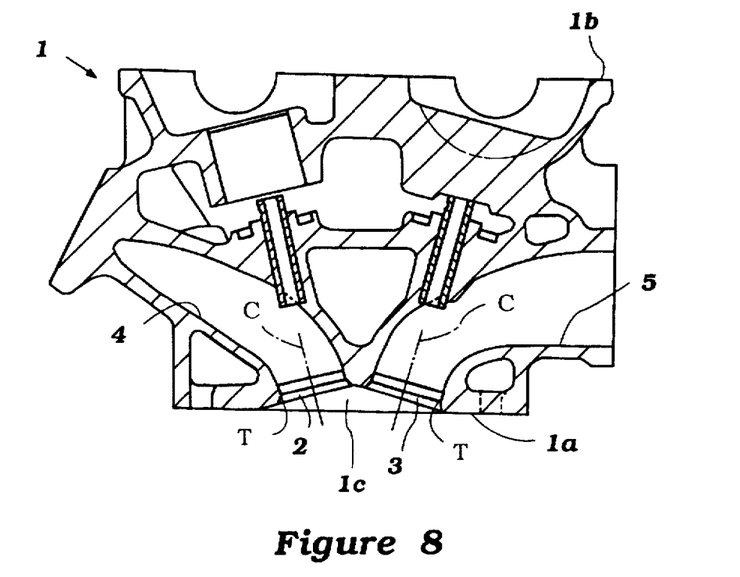
FIG. 8 is a schematic vertical cross-sectional partial view illustrating one embodiment of a cylinder head unit of the present invention.
Figure 9:
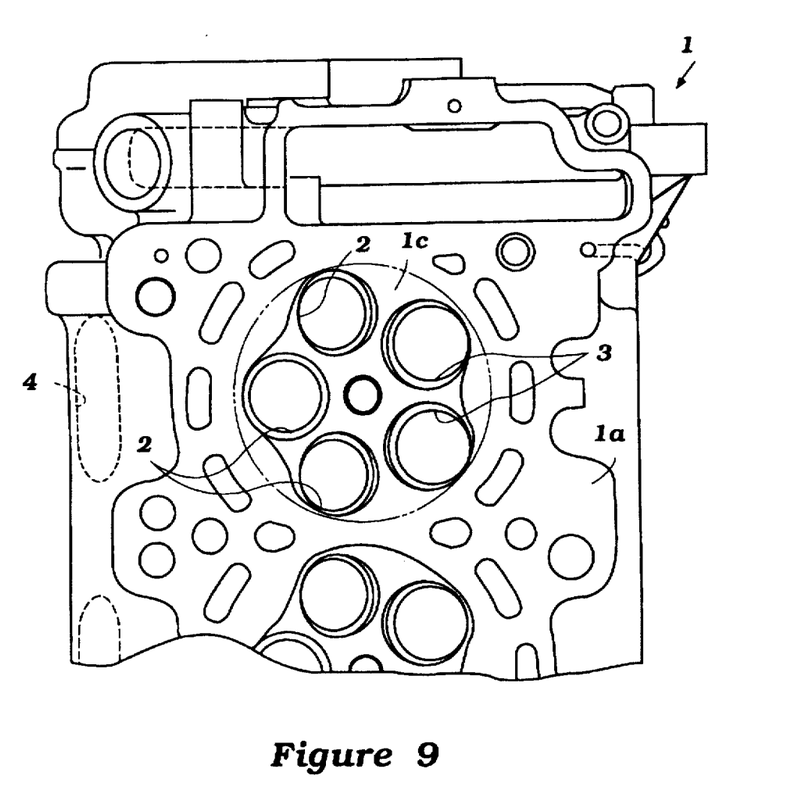
FIG. 9 is a schematic base partial view illustrating one embodiment of the cylinder head unit depicted in FIG. 8.

In FIGS. 8 and 9, a cylinder head 1 formed by an aluminum die cast method, which comprises valve seat-bonding area structures of the present invention, are to be connected to a cylinder block (not shown) at a cylinder head lower connecting surface 1a, and a head cover (not shown) at a cylinder head upper connecting surface 1b. In the cylinder head lower connecting surface 1a, a recessed portion 1c, which constitutes the top portion of a combustion room, is provided. In the recessed portion, three intake gas openings and two exhaust gas openings are formed. The intake gas openings 2 lead to one side of the cylinder head 1 through intake gas ports 4, while the exhaust gas openings 3 lead to the other side of the cylinder head 1 through exhaust gas ports 5.

Valve Seat-Bonding Area Structures

Figure 1:
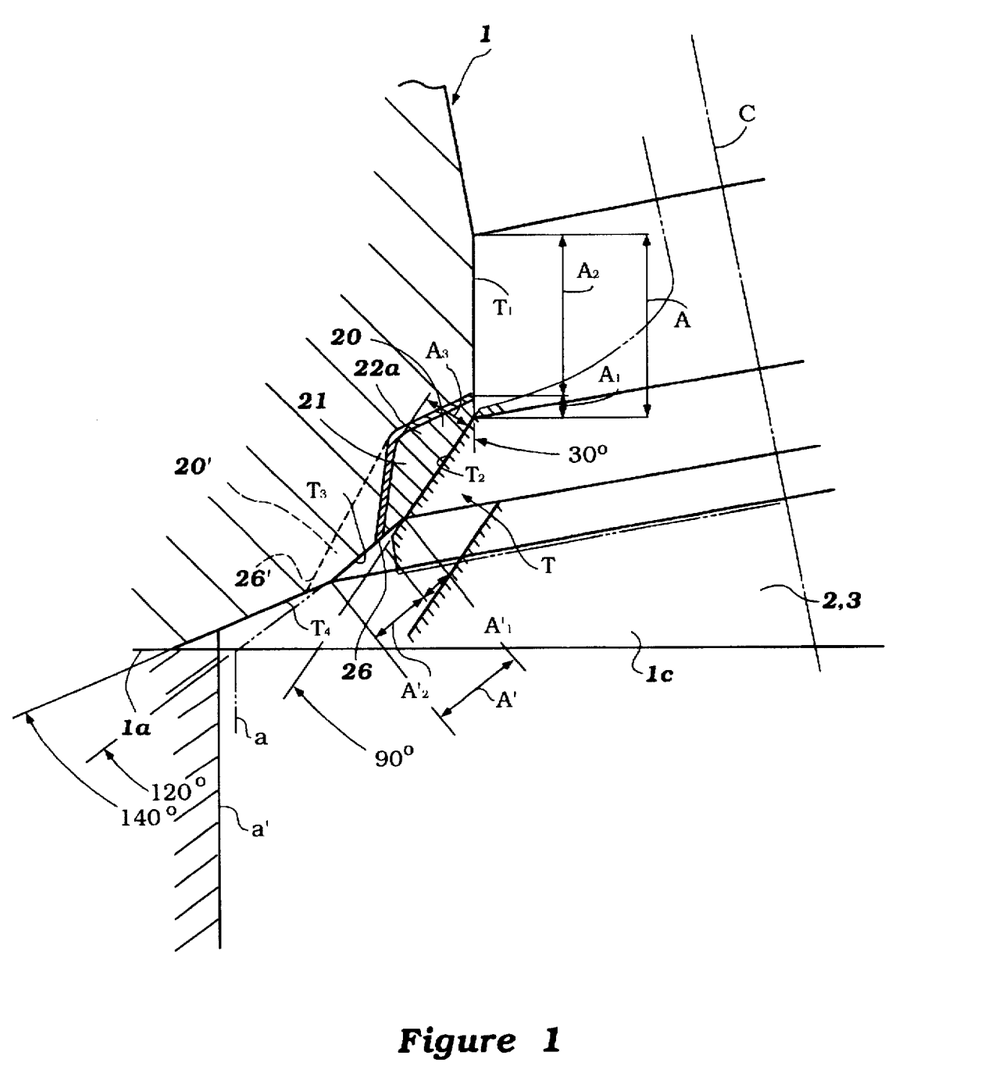
FIG. 1 is a schematic cross-sectional partial view showing the main part of one embodiment of valve seat-bonded area structures of the present invention.
Figure 2A:
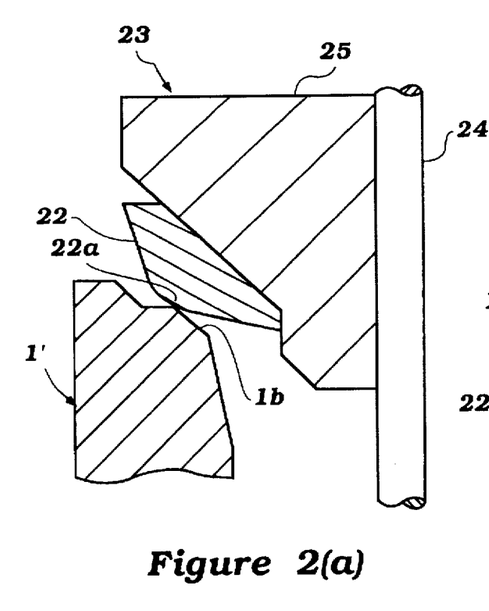
FIG. 2 is a schematic cross-sectional partial view illustrating one embodiment of a bonding step of a method for integrally producing the cylinder head unit and valve seat, in which the cylinder head is treated in the order, (a), (b), (c) and (d).
Figure 2B:
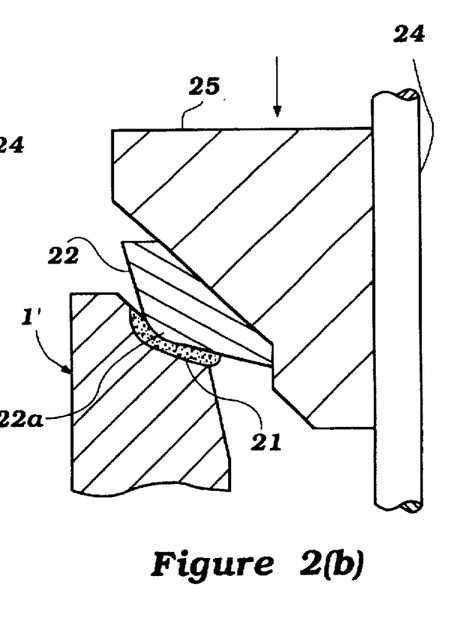
Figure 2C:
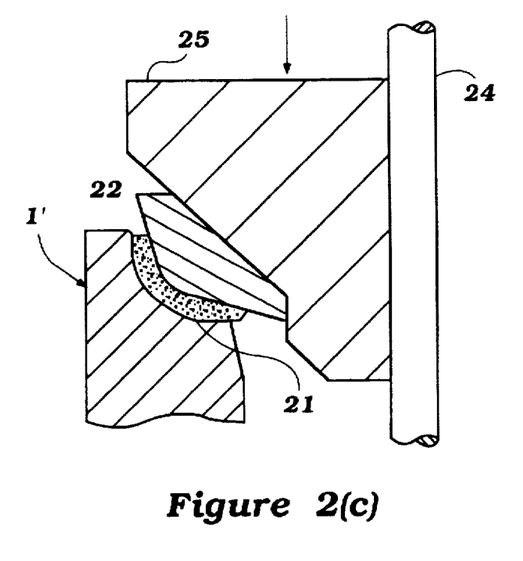
Figure 2D:
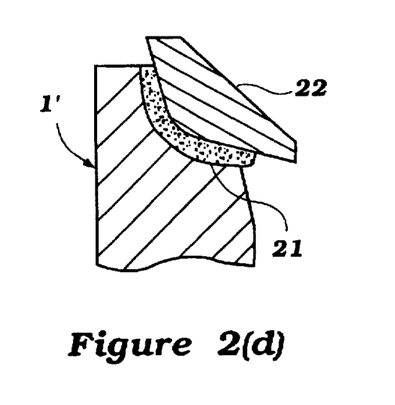

As shown in FIG. 1, valve seat material 20 (a different metal layer) is embedded in the cylinder head 1 by a solid state diffusion method (plastic deformation-bonding method), and the cylinder head 1 comprises four tapered surfaces, i.e., a first tapered surface T1 having an open angle of 30° with respect to an axis of a valve shaft C (hereinafter, the open angle is expressed with respect to the axis C); a second tapered surface T2 (valve seat surface), outward of the first tapered surface, having an op-en angle of 90°; a third tapered surface T3 (first tapered guide surface), outward of the second tapered surface, having an open angle of 120°; and a fourth tapered surface T4 (second tapered guide surface), outward of the third tapered surface, having an open angle of 140°. Between the valve seat material 20 and the cylinder head material, an intermetallic layer 21 (plastic deformation layer) is formed.

In the above, the second tapered surface T2 is composed entirely of the valve seat material 20, while a part of each first and third tapered surfaces T1 and T3 is composed of the valve seat material 20, and the remaining (predominant) parts of each first and third tapered surfaces T1 and T3 are composed of the cylinder head material. In other words, the ratio of the circumferential area of the cylinder head material to that of the entire circumferential area of the first tapered surface T1, A2/A, and the ratio of the circumferential area of the cylinder head material to that of the entire circumferential area of the third tapered surface T3, A2'/A', are over 50%, particularly approximately 90%. By increasing the ratios A2/A and A2'/A' to over 50%, it is possible to appropriately set the grinding conditions based on the characteristics of the cylinder head material, thereby improving the accuracy of grinding and the durability of the bit. The ratio of the circumferential area of the valve seat material to that of the entire area of each first and third tapered surface T1 and T3, each A1/A and A1'/A', is as low as approximately 10%. Since the valve seat material and the cylinder head material are made of an Fe-based sintered alloy and an aluminum alloy respectively, their coefficients of linear expansion are very different, thereby causing separation of the valve seat from the cylinder head unit due to thermal stress. By decreasing A1/A and A1'/A', it is possible to reduce thermal stress generated at the boundary, thereby preventing separation. In this embodiment, the length of each A1 and A1' of the valve seat material is less than 1 mm, particularly approximately 0.3–0.5 mm, and the thickness of the valve seat material A3 is approximately 0.5 mm. In addition, the cross-section of the valve seat material 20 is a triangle. The cross-sectional shape is dependent on the method of bonding, and when the solid-state diffusion method (plastic deformation-bonding method) is employed, the cross-sectional shape is usually a triangle in order to exert high pressure on the contacting point of the cylinder head material and the valve seat material.

Near the lower connecting surface 1a below the intake gas opening 2 and the exhaust gas opening 3, the fourth tapered surface T4 (the second tapered guide surface) having a larger open angle than that of the third tapered surface T3, as well as a grinding undercut surface "a'" which has a larger diameter than that of a grinding guide surface "a" having a diameter corresponding to the rotation diameter of a bit for the third tapered surface T3 (for 120°-grinding), are formed. The open angle of T4 is 140°, and the grinding undercut surface "a'" for grinding the 140°-surface T4 has a diameter approximately 0.6 mm larger than that of the grinding guide surface "a" for grinding the 120°-surface T3. By forming the fourth tapered surface T4 (the second tapered guide surface) and the grinding undercut surface "a'", it is possible to prevent the occurrence of pitting and cracking of the ground surfaces during grinding, and improve the gas-interchanging efficiency by rendering the flow of intake gas and exhaust gas smooth.

Production Process of Valve Seat-Bonding Area Structures

FIGS. 2–7 illustrate one example of production processes of the valve seat-bonding area structures, comprising a bonding step, a preliminary grinding step, and a final grinding step.

1. Bonding Step

First, a connecting surface 1b composed of a flat surface and a tapered surface is formed at the edge of a valve opening of a cylinder head material 1' formed by an aluminum die cast method. While a seat ring 22 made of an Fe-based sintered alloy, whose surface is treated by Cuplating, is obtained (see FIG. 2 (a)). The seat ring 22 has triangular cross-sectional view having a point 22a. Due to the point 22a, the surface pressure against the cylinder head material is increased when pressed, thereby easily inducing plastic deformation of the material. The seat ring 22 is then placed on the connecting surface 1b of the cylinder head material 1', and a pressing device 23 is disposed on the seat ring 22 (see FIG. 2 (a)). The pressing device 23 comprises a guide bar 24 and an electrode 25 freely movable in the axis direction of the guide bar 24. The electrode 25 impresses a voltage to the seat ring 22 while pressing the seat ring 22. Accordingly, the point 22a of the seat ring 22 pushes the connecting surface 1b and moves into the cylinder head material 1' while inducing plastic deformation of the cylinder material (see FIG. 2(b) and (c)). As a result, an intermetallic layer 21 is formed, due to plastic deformation of the cylinder head material, in the boundary between the seat material and the cylinder head material, thereby bonding the seat ring 20 to the cylinder head (see FIG. 2(d)).

2. Preliminary Grinding

Figure 3A:
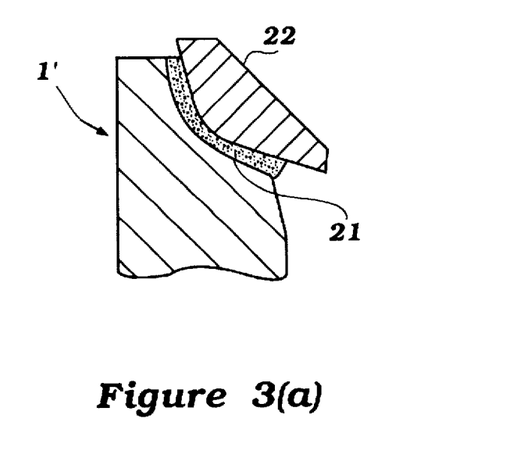
FIG. 3 is a schematic cross-sectional partial view illustrating one embodiment of preliminary and final grinding steps of a method for forming tapered surfaces in the valve seat-bonding area, in which the cylinder head is treated in the order, (a), (b), (c) and (d).
Figure 3B:
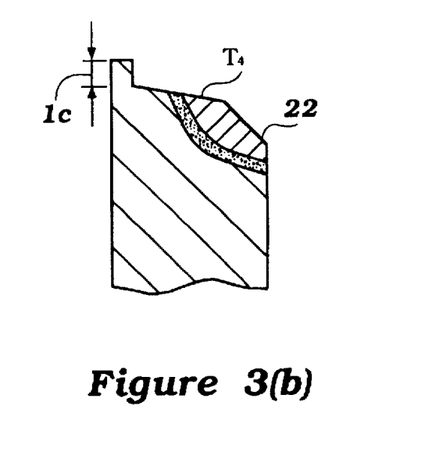
Figure 3C:
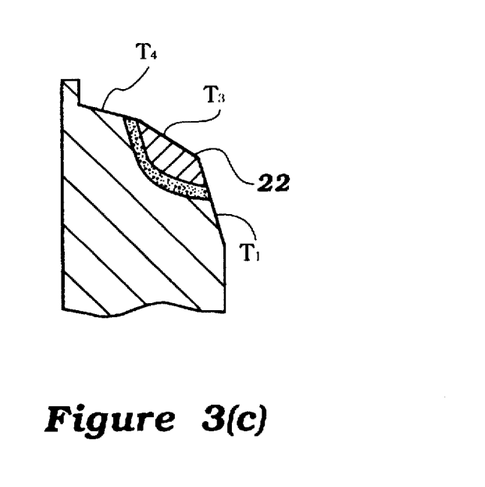
Figure 4:
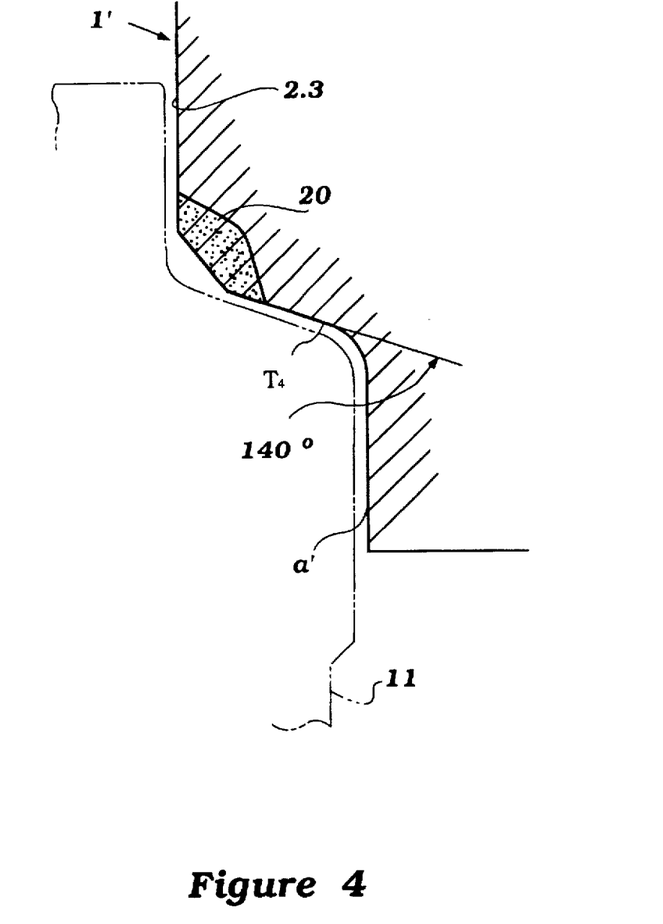
FIG. 4 is a schematic cross-sectional partial view illustrating one embodiment of a preliminary grinding step of a method for forming a fourth tapered surface (a second tapered guide surface).
Figure 5:
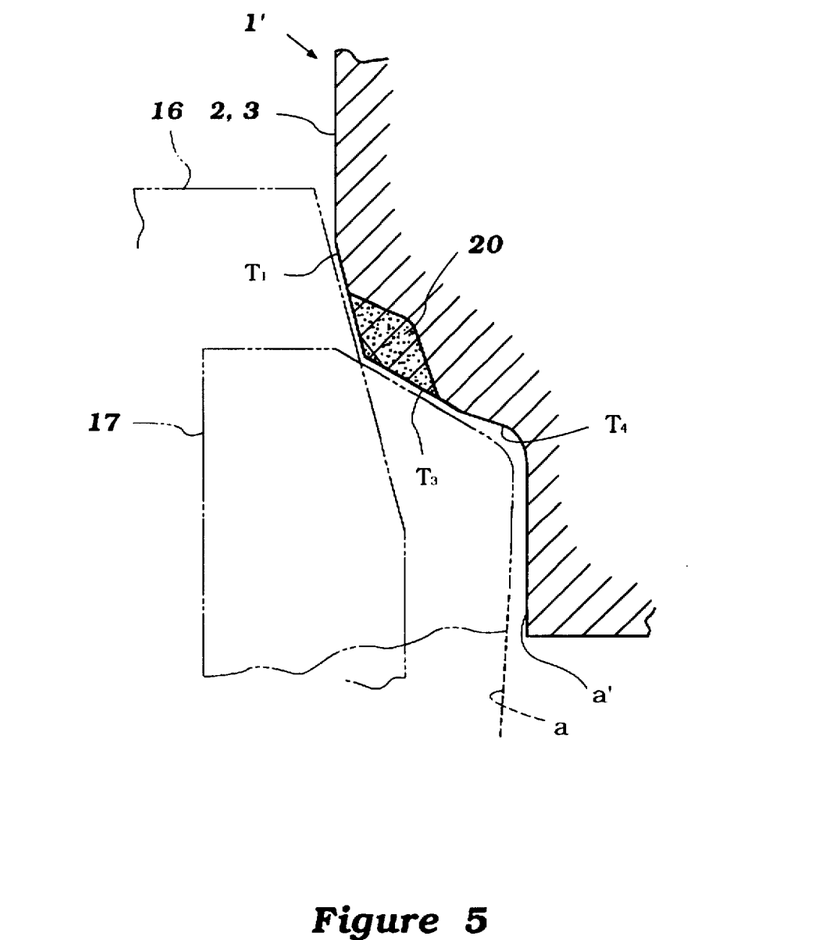
FIG. 5 is a schematic cross-sectional partial view illustrating one embodiment of a final grinding step of a method for forming first and third tapered surfaces.
Figure 6:
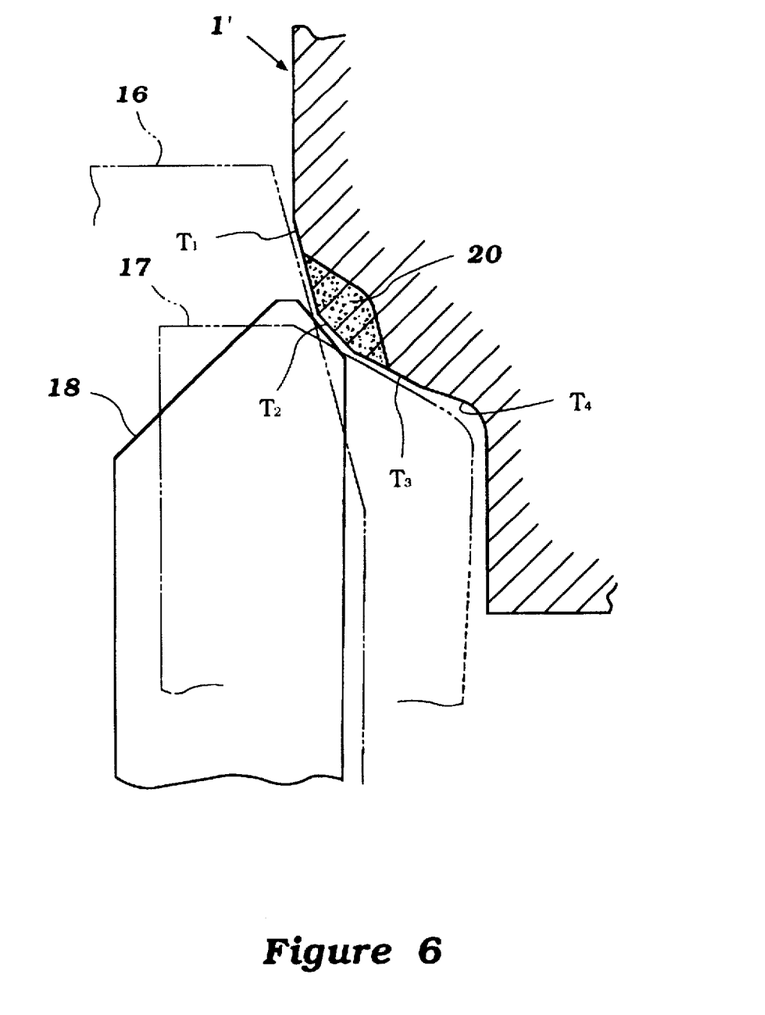
FIG. 6 is a schematic cross-sectional partial view illustrating one embodiment of a final grinding step of a method for forming a second tapered surface (a valve seat surface).

First, the seat ring 22 bonded to the cylinder head material is ground so as to form a fourth tapered surface T4 (second tapered guide surface) having an open angle of 140° with an end mill 11, and a grinding undercut surface "a'" having a diameter approximately 0.6 mm larger than that of a grinding guide surface "a" for grinding a 120°-surface (see FIG. 3(a) and (b), and FIG. 4). The intake and exhaust gas openings 2 and 3 can be formed concurrently with the fourth tapered surface T4, with the end mill 11. The depth of the opening edge 1c should be as small as practical. Since the fourth tapered surface T4 is formed with an end mill, cracking and pitting do not easily occur.

3. Final Grinding

Figures 7A, 7B, 7C:
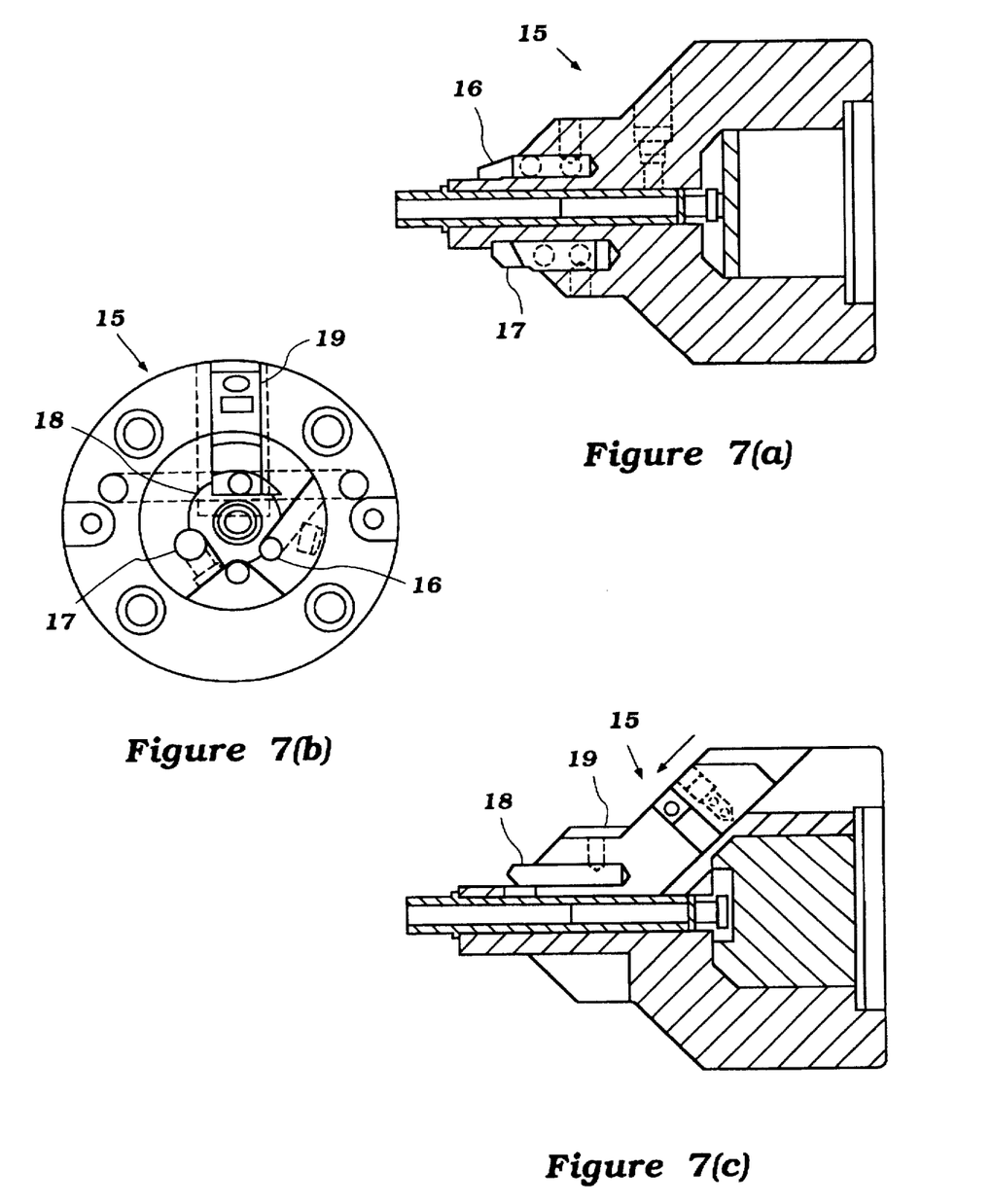
FIG. 7(b) illustrates a schematic plane view.
FIG. 7(a) and FIG. 7(c) illustrate schematic cross-sectional views perpendicular to each other.

A bit holder 15 used in this embodiment can rotate while freely moving back and forth, using a motor and a main shaft apparatus (not shown). In the bit holder 15, a 30°-bit 16, a 120°-bit 17, and a 90°-bit 18 are installed, and the 90°-bit 18 is connected to a transfer member 19 which moves with respect to the bit holder 15 in the axis direction of the bit holder 15. The above bits are preferably CBN bits, since CBN bits have high abrasion resistance.

When the transfer member 19 is retracted, the bit holder 15 is inserted into the openings 2 and 3 of the cylinder head material 1'. First, the 30°-bit 16 and the 120°-bit 17 move forward and conduct plunge treatment, thereby forming the first tapered surface T1 (inward tapered guide surface) and the third tapered surface T3 (outward tapered guide surface) at the same time (see FIG. 3(c)). After the plunge treatment, both bits 16 and 17 are retracted by approximately 0.2 mm (see FIG. 5).

Figure 3D:
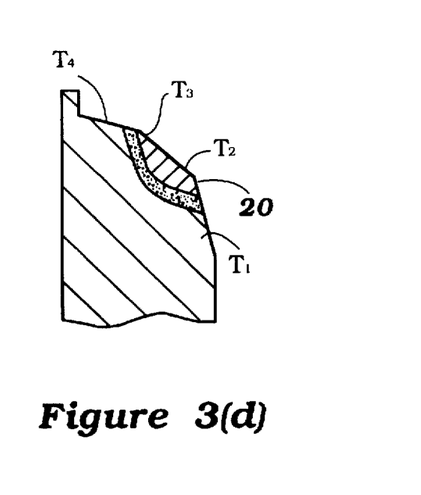

The transfer member 19 then moves forward, and conducts traverse treatment with the 90°-bit 18, thereby forming the second tapered surface T2. During the above treatment, since there is a gap of approximately 0.3 mm between the external rotation diameter of the 120°-bit 17 and the grinding undercut surface "a'", the 120°-bit 17 does not touch any surface, thereby in no way interfering with the movement of the 90°-bit 18 (see FIG. 6) (no significant vibration transferred from the 120°-bit to the 90°-bit). Accordingly, the valve seat-bonding area T of the cylinder head 1 can be formed (see FIG. 1 and FIG. 3 (d))

In the above, the boundary 26 between the cylinder head material 1' and the valve seat material 20 is located on the third tapered surface T3 (the first tapered guide surface). However, the boundary can be located on the fourth tapered surface T4 (the second tapered guide surface), as shown in FIG. 1 (indicated by broken lines). That is, the boundary 26' between the valve seat material 20' and the cylinder head material 1' can be located on the fourth tapered surface T4, in which the entire third tapered surface T3 is composed of the valve seat material 20'.

The valve seat-bonding area structures of the present invention have desirably been formed in connection with a method for affixing a valve seat into a cylinder head under compression, the details of which are set forth in a U.S. patent application entitled "Valve Seat," Ser. No. 08/278,026, filed on Jul. 20, 1994 (claiming priority from Japanese Patent Application No. 200325, filed Jul. 20, 1993 and No. 250559, filed Oct. 6, 1993), which is hereby incorporated herein by reference. Further, the valve seat-bonding area structures of the present invention have desirably been formed in connection with a method of solid-state diffusion effected by formation of a plastic deformation layer, the details of which are set forth in a U.S. patent application entitled "Valve Seat-Bonded Cylinder Head and Method for Producing Same," Ser. No. 08/483,246, filed on Jun. 7, 1995 (claiming priority from Japanese Patent Application No. 027300, filed Jan. 23, 1995 and No. 076623, filed Mar. 31, 1995), which is hereby incorporated herein by reference.

We claim:

1. Valve seat-bonding area structures of a cylinder head unit having a connecting surface adapted to be connected to a cylinder block, wherein a valve seat made of a metal different from and harder than that of said cylinder head unit is bonded to a circumference of a valve opening of said cylinder head unit, said valve seat-bonding area structures comprising, other than the connecting surface:
 a valve seat surface which is circumferentially formed on said valve seat and which is adapted to be in contact with a valve, said surface being tapered at a first angle with respect to an axis of a valve shaft;
 a first tapered guide surface which is circumferentially formed outward of said valve seat surface, said first tapered guide surface being tapered at a second angle which is greater than said first angle with respect to the axis of the valve shaft; and
 a second tapered guide surface which is circumferentially formed outward of said first tapered guide surface, said second tapered guide surface being tapered at a third angle which is greater than said second angle with respect to the axis of the valve shaft.

2. The valve seat-bonding area structures of a cylinder head unit according to claim 1, wherein the outward boundary between said valve seat and the metal of said cylinder head unit is located in either of said first tapered guide surface or said second tapered guide surface.

3. The valve seat-bonding area structures of a cylinder head unit according to claim 1, further comprising an inward tapered surface circumferentially formed inward of said valve seat surface, said inward tapered surface being tapered at a angle smaller than said first angle with respect to the axis of the valve shaft.

4. The valve seat-bonding area structures of a cylinder head unit according to claim 3, wherein the inward boundary between said valve seat and the metal of said cylinder head unit is located in said inward tapered surface.

5. The valve seat-bonding area structures of a cylinder head unit according to claim 2, wherein, in either of said first tapered guide surface or said second tapered guide surface whichever said outward boundary is located in, the ratio of the surface area of the metal of said cylinder head unit to the surface area of the metal of said valve seat is greater than or less than one.

6. The valve seat-bonding area structures of a cylinder head unit according to claim 4, wherein, in said inward tapered surface, the ratio of the surface area of the metal of said cylinder head unit to the surface area of the metal of said valve seat is greater than or less than one.

7. The valve seat-bonding area structures of a cylinder head unit according to claim 1, wherein the metal of said valve seat is made of Fe-based sintered alloy, and the metal of said cylinder heat unit is made of an aluminum alloy.

8. The valve seat-bonding area structures of a cylinder head unit according to claim 1, wherein said valve seat is bonded to said cylinder heat unit by solid-state diffusion, in which a valve seat ring has been placed on said circumference of the valve opening of said cylinder head unit, and pressed against said circumference while a voltage is impressed between said valve seat ring and said cylinder head unit.

9. Valve seat-bonding area structures of a cylinder head unit having a connecting surface adapted to be connected to a cylinder block, wherein a valve seat made of a metal different from and harder than that of said cylinder head unit is bonded to a circumference of a valve opening of said cylinder head unit, said valve seat-bonding area structures comprising, other than the connecting surface:
 a valve seat surface which is circumferentially formed on said valve seat and which is adapted to be in contact with a valve, said surface being tapered at a first angle with respect to an axis of a valve shaft; and
 a tapered guide surface which is circumferentially formed outward of said valve seat surface, said tapered guide surface being tapered at a second angle which is greater than said first angle with respect to the axis of the valve shaft, wherein the outward boundary between said valve seat and the metal of said cylinder head unit is located in said tapered guide surface.

10. The valve seat-bonding area structures of a cylinder head unit according to claim 9, further comprising an inward tapered surface circumferentially formed inward of said valve seat surface, said inward tapered surface being tapered at a angle smaller than said first angle with respect to the axis of the valve shaft.

11. The valve seat-bonding area structures of a cylinder head unit according to claim 10, wherein the inward boundary between said valve seat and the metal of said cylinder head unit is located in said inward tapered surface.

12. The valve seat-bonding area structures of a cylinder head unit according to claim 9, wherein, in said tapered guide surface, the ratio of the surface area of the metal of said cylinder head unit to the surface area of the metal of said valve seat is greater than or less than one.

13. The valve seat-bonding area structures of a cylinder head unit according to claim 11, wherein, in said inward tapered surface, the ratio of the surface area of the metal of said cylinder head unit to the surface area of the metal of said valve seat is greater than or less than one.

14. The valve seat-bonding area structures of a cylinder head unit according to claim 9, wherein the metal of said valve seat is made of Fe-based sintered alloy, and the metal of said cylinder heat unit is made of an aluminum alloy.

15. The valve seat-bonding area structures of a cylinder head unit according to claim 9, wherein said valve seat is bonded to said cylinder heat unit by solid-state diffusion, in which a valve seat ring has been placed on said circumference of the valve opening of said cylinder head unit, and pressed against said circumference while a voltage is impressed between said valve seat ring and said cylinder head unit.

16. A valve seat-bonded cylinder head having at least one valve opening, in which a valve seat is bonded to a circumference of each valve opening of a cylinder head unit, said valve seat being made of a metal different from and harder than that of said cylinder head unit, said valve seat-bonded cylinder head having valve seat-bonding area structures at each valve opening, said structure comprising:

- a valve seat surface which is circumferentially formed on said valve seat, said surface being tapered at a first angle with respect to an axis of a valve shaft;
- a first tapered guide surface which is circumferentially formed outward of said valve seat surface, said first tapered guide surface being tapered at a second angle which is greater than said first angle with respect to the axis of the valve shaft; and
- a second tapered guide surface which is circumferentially formed outward of said first tapered guide surface, said second tapered guide surface being tapered at a third angle which is greater than said second angle with respect to the axis of the valve shaft, said valve seat being formed of material different from and harder than that of said cylinder head unit, wherein said valve seat is bonded to said cylinder head unit by solid-state diffusion, without forming a melting reaction layer therebetween, and a plastic deformation layer is formed on the bonding boundary at least on the cylinder head unit side.

17. The valve seat-bonded cylinder head according to claim 16, wherein the outward boundary between said valve seat and the metal of said cylinder head unit is located in either of said first tapered guide surface or said second tapered guide surface.

18. The valve seat-bonded cylinder head according to claim 16, further comprising an inward tapered surface circumferentially formed inward of said valve seat surface, said inward tapered surface being tapered at an angle smaller than said first angle with respect to the axis of the valve shaft.

19. The valve seat-bonded cylinder head according to claim 18, wherein the inward boundary between said valve seat and the metal of said cylinder head unit is located in said inward tapered surface.

20. A valve seat-bonded cylinder head having at least one valve opening, in which a valve seat is bonded to a circumference of each valve opening of a cylinder head unit, said valve seat being made of a metal different from and harder than that of said cylinder head unit, said valve seat-bonded cylinder head having valve seat-bonding area structures at each valve opening, said structure comprising:

- a valve seat surface which is circumferentially formed on said valve seat, said surface being tapered at a first angle with respect to an axis of a valve shaft; and
- a tapered guide surface which is circumferentially formed outward of said valve seat surface, said tapered guide surface being tapered at a second angle which is greater than said first angle with respect to the axis of the valve shaft, wherein the outward boundary between said valve seat and the metal of said cylinder head unit is located in said tapered guide surface.

21. The valve seat-bonded cylinder head according to claim 20, further comprising an inward tapered surface circumferentially formed inward of said valve seat surface, said inward tapered surface being tapered at an angle smaller than said first angle with respect to the axis of the valve shaft.

22. The valve seat-bonded cylinder head according to claim 21, wherein the inward boundary between said valve seat and the metal of said cylinder head unit is located in said inward tapered surface.

23. The valve seat-bonded cylinder head according to claim 20, wherein, in said tapered guide surface, the ratio of the surface area of the metal of said cylinder head unit to the surface area of the metal of said valve seat is greater than or less than one.

* * * * *

UNITED STATES PATENT AND TRADEMARK OFFICE
CERTIFICATE OF CORRECTION

PATENT NO. : 5,787,853
DATED : August 4, 1998
INVENTOR(S) : Adachi et al.

It is certified that error appears in the above-identified patent and that said Letters Patent is hereby corrected as shown below:

Claim 7,
Line 4, please delete -- heat -- and replace with -- head --.

Claim 8,
Line 7, please delete -- heat -- and replace with -- head --.

Claim 15,
Line 57, please delete -- heat -- and replace with -- head --.

Signed and Sealed this

Nineteenth Day of March, 2002

Attest:

Attesting Officer

JAMES E. ROGAN
Director of the United States Patent and Trademark Office